April 11, 1933.  R. J. H. PLANIOL  1,903,685
SPEED INDICATOR
Filed July 8, 1929  2 Sheets-Sheet 1
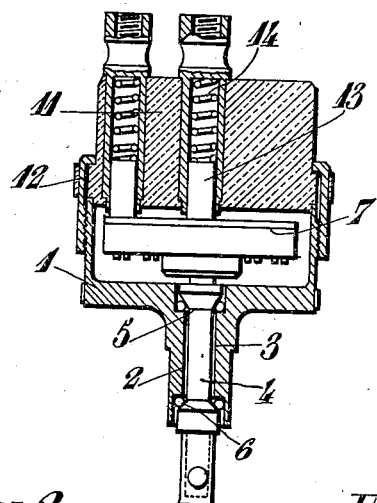
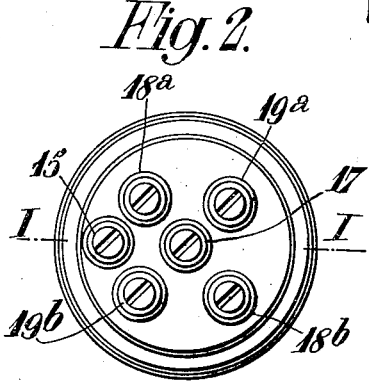
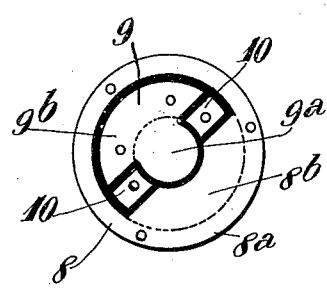
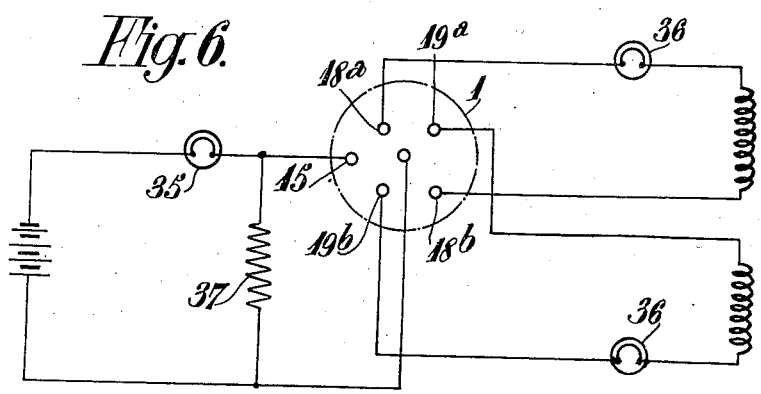
R. J. H. Planiol
INVENTOR April 11, 1933. R. J. H. PLANIOL 1,903,685
SPEED INDICATOR
Filed July 8, 1929 2 Sheets-Sheet 2

R. J. H. Planiol
INVENTOR

Patented Apr. 11, 1933

1,903,685

UNITED STATES PATENT OFFICE

RENÉ JACQUES HENRI PLANIOL, OF PARIS, FRANCE, ASSIGNOR TO ETABLISSEMENTS ED. JAEGER, OF LEVALLOIS-PERRET, FRANCE, A JOINT-STOCK COMPANY OF FRANCE

SPEED INDICATOR

Application filed July 8, 1929, Serial No. 376,774, and in France July 20, 1928.

My invention relates to speed indicators in which the connection between the shaft, the angular speed of which is to be measured, and the indicating mechanism, is electrically obtained. This invention particularly relates to apparatus of the above mentioned type, which are constituted by the combination of a source of direct current, of a system producing multiphase currents, fed by the said source and actuated by the shaft the angular speed of which is to be measured, of an asynchronous receiver for the multiphase currents produced by this generator, comprising a stator and a rotor, and of means allowing to measure at every instant the torque applied to the rotor of the receiver for evaluating, by a suitable calibration, the speeds to be measured.

Apparatus of this type are lacking in accuracy, because their indications depend on the voltage at the terminals of the source of supply of direct current, and that this voltage is not constant.

The main object of the invention is to avoid this inconvenience, and to render perfectly accurate apparatus of the type indicated, even when the voltage at the terminals of the source of supply of direct current changes between somewhat wide limits.

Another object of the invention is also to maintain constant the average current feeding the receiver; in the apparatus already known, this average current diminishes, in fact, somewhat appreciably in proportion as the speed of rotation increases.

The invention has also for object to simplify the construction of the said apparatus, to reduce the cost price of the same, and to improve their operation.

The form of construction I actually prefer is described hereinafter with reference to the accompanying drawings in which:

Figure 1 is a sectional elevation, made according to line I—I of Fig. 2, showing the system generating multiphase currents.

Figure 2 is a corresponding plan view.

Figure 3 is a top view of the rotor of the system generating multiphase currents.

Figure 6 is a diagrammatic view of the assemblage.

Throughout the specification, the same reference numbers designate like parts.

Figure 4:
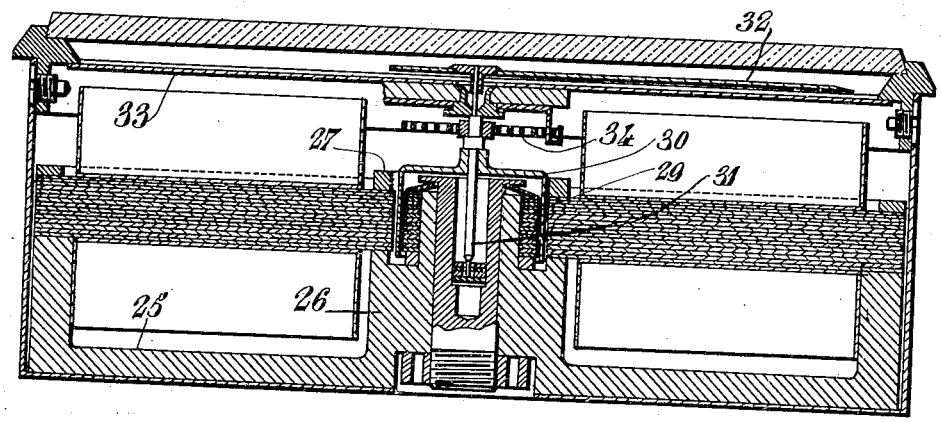
Figure 4 is a sectional elevation made according to line IV—IV of Fig. 5 and shows the indicator-receiver.
Figure 5:
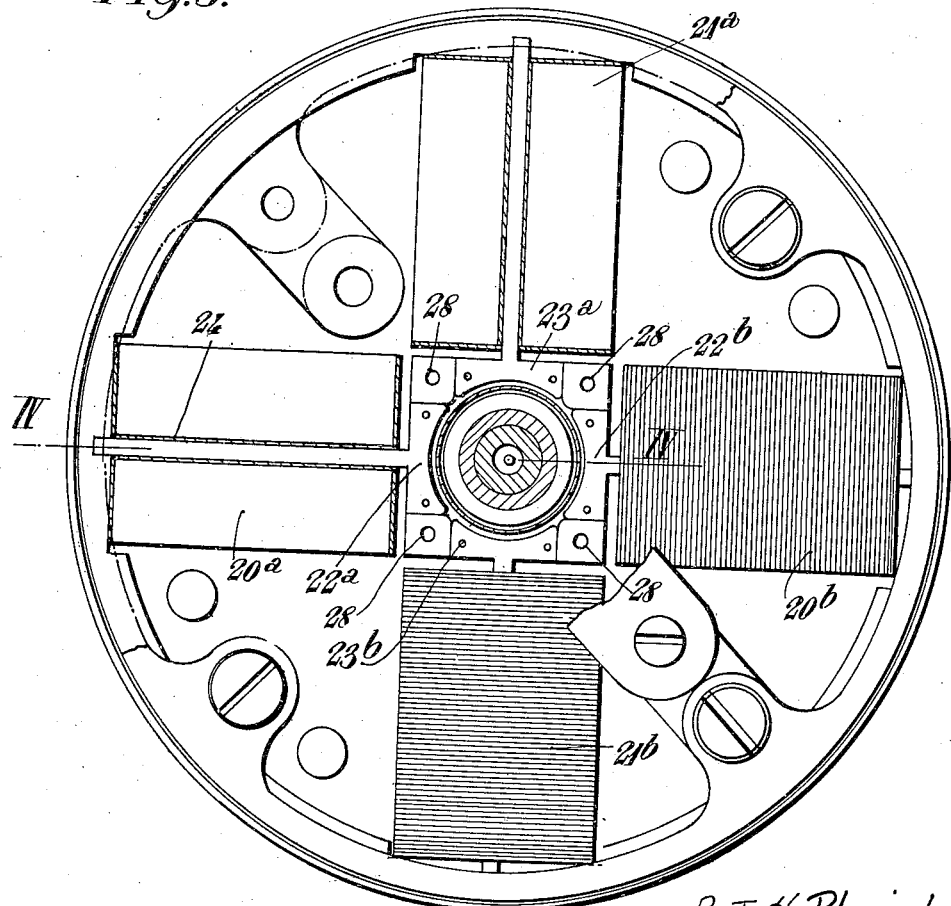
Figure 5 is a corresponding plan view.

The apparatus forming the subject-matter of the invention comprises two main parts, one, constituted by the multiphase current generator, is illustrated in Figs. 1 to 3, whilst the other, which is the indicator-receiver, is illustrated in Figs. 4 and 5. These parts are successively described.

Numerous devices exist allowing to obtain multiphase currents by means of a source of direct current; any of these known devices can be used. The device I actually prefer is constituted as follows:

A casing 1 (Fig. 1) is provided with a boss 2 perforated with an axial hole 3. A shaft 4 is fitted in this axial hole and is supported by ball abutments 5 and 6. This shaft is connected by any kinematic means to the shaft the speed of which is to be measured.

Within the casing 1, the shaft 4 carries a plate 7, shown in plan view in Fig. 3. This plate constitutes the rotor of the multiphase current generator. The upper surface of the said plate 7 is provided with two conducting parts or walls 8 and 9, separated by insulating walls. The wall 8 is composed of the ring $8^a$ and of the crescent-shaped member $8^b$, which constitutes nearly a half-circle, whilst the wall 9 is composed of the ring $9^a$ and of the crescent-shaped member $9^b$ which also constitutes nearly a half-circle. The crescent-shaped members $8^b$ and $9^b$ are separated from each other by the insulating interval 10.

The cover 11 of the casing is mounted on the latter through the medium of an internally threaded ring 12 screwing on a corresponding externally threaded portion of the casing. Through the cover 11 pass six conducting brush-carriers, embedded in the insulating mass of the said casing. These brushes are constituted by carbon sticks 13 which, pushed by springs 14, rub against the plate 7.

The contact piece 15, connected to one of the poles of the battery 16 supplying direct current, is thus in permanent contact with the ring $8^a$; the contact piece 17, connected to the second pole of the battery 16, is in permanent contact with the ring $9^a$. The four other contact pieces are arranged at the corners of a square having the center of the plate 7 as center of said figure. Two opposed contact pieces $18^a$—$18^b$ correspond to one of the phases of the multiphase current produced, the two other contact pieces $19^a$—$19^b$ correspond to the other phase.

If we consider the two contact pieces $18^a$—$18^b$, it will be seen that, by the rotation of the plate 7, each of them is alternately connected, during nearly one half revolution of the plate 7, to each of the poles of the battery. Consequently, between the contact pieces $18^a$—$18^b$ is created an alternating difference of potential, of rectangular shape, the frequency of which is equal to the number of revolutions per second of the plate 7. Likewise, between the contact pieces $19^a$—$19^b$ is created an identical alternating tension, but displaced of $$\frac{\pi}{2}$$

in phase relatively to the tension between the contact pieces $18^a$—$18^b$.

The receiver of the multiphase currents thus produced is constituted as illustrated in Figs. 4 and 5 of the drawings.

This receiver comprises, in the example chosen, four windings. Two of these windings $20^a$ and $20^b$ are diametrally opposite each other and fed in series by the current produced between the contact pieces $18^a$ and $18^b$; the two other windings $21^a$ and $21^b$ are also diametrally arranged opposite each other, but they are placed at right angles to the windings $20^a$—$20^b$, and they are fed by the current produced between the contact pieces $19^a$ and $19^b$. These windings, displaced of $$\frac{\pi}{2},$$

and through which pass alternating currents of the same frequency, also displaced of $$\frac{\pi}{2},$$

give, between their polar pieces $22^a$—$22^b$, $23^a$—$23^b$ a rotating field which will be used as explained hereinafter.

The said windings each comprise a core or armature such as 24, the cross section of which is sufficiently reduced in order that the portion of the magnetic circuit it represents be brought to a suitable point of the magnetization curve of the metal constituting this core. The core 24 is outwardly flared for constituting the polar piece $22^a$ (or $22^b$—$23^a$—$23^b$). At the other end, this core, which is constituted of a pile of small sheet-iron plates, is secured on the body 25 of the apparatus casing. This body 25 is provided, at its center, with a boss 26 on which bear the polar pieces $22^a$—$22^b$, $23^a$—$23^b$. The fixing in position of these polar pieces is terminated by means of a washer 27 secured on the boss 26 by screws or rivets 28. The boss 26 receives, at its central portion, a pile 29 of sheet-iron washers, through which the magnetic circuit closes, and, between the crown 29 and the polar pieces $22^a$—$22^b$, $23^a$—$23^b$, moves a metal bell 30 in which the induced currents develop. This bell is carried by the pivot 31, which receives the indicating pointer 32, which latter moves over a dial 33; moreover, the pivot 31 is returned by a spring 34 which always tends to bring back the pointer 32 opposite the zero of the graduation.

The currents induced in the bell 30, by the rotating field, tend to rotate this member in the direction of the rotation of the field. The speed of rotation of the field, which is obviously the speed of rotation of the plate 7, creates on the bell 30 a torque which is a direct function of this speed. The measurement of this torque, which is effected by the spring 34, gives, consequently, the measurement of the speed.

It is to be noted that, particularly when an indicator placed on board a motor vehicle or an airplane is considered, (indicator fed by the battery of accumulators of the said vehicle or the said airplane), the tension of the battery varies according as it is discharging, at rest, or charging. This variation can be considerable, and, if means were not provided for avoiding this inconvenience, the indications of the meter would not be exact. In accordance with the invention and for avoiding this trouble, a suitable throttled section is provided, which section is that of the cores such as 24, in the magnetic circuit, so as to bring a portion of the latter to a suitable point of the curve of magnetization of the metal constituting the said magnetic circuit. In these conditions, the magnitude of the magnetic field, in the air gap, between the polar pieces $22^a$—$22^b$, $23^a$—$23^b$, and the crown 29, becomes independent of the tension of the source of supply or at least depends on the same to a sufficiently slight extent so that the variations of this source of supply do not put the meter out of order to a substantial amount.

In some cases, the correction obtained by this throttling of the magnetic circuit, is not quite sufficient for giving a perfect accuracy. A lamp 35 having an iron filament in an atmosphere of hydrogen, as illustrated in Fig. 6, can then be inserted, between the battery and the terminals of the circuit, in order to maintain a nearly constant current in this circuit, whatever may be the variations of tension of the battery. However, this arrangement still presents an inconvenience, in that the regulation of the current takes place on the direct current circuit, which current is subdivided into two or more multiphase currents. By the means indicated, the sum of the average currents is indeed maintained constant, but it is obvious that each of the average currents can vary, which is prejudicious to the proper conditions of working of the meter, and to the accuracy of the indications. It is much more preferable that the average current in each phase should be maintained constant by the use of a lamp having an iron filament in an atmosphere of hydrogen, such as 36, arranged on each of the phases.

The use of iron filament lamps, as just stated, has an advantage in direct proportion to the speed of rotation. In fact, when the meter is fed with tensions of rectangular shape as above stated, the average current is nearly equal to the maximum current as long as the distributor does not rotate too rapidly, but, as soon as the speed begins to become important, the self-induction effects retard the passage of the current in the coils and the average current then diminishes to a somewhat large extent. In case of high speeds of rotation, it is therefore necessary, not only to regularize the tension of the source of supply, by means of iron filament lamps, but also to maintain the average current constant. The lamp 35 fulfills the first condition; the lamps 36 can satisfy the second condition, provided the distributor 1 is shunted by a resistance 37. This arrangement, which is shown in Fig. 6, combined with the throttling of the magnetic circuit, gives an almost perfect correction of the indications of the meter. But it is obvious that, besides the saturation of the magnetic circuit which is indispensable, it will be sufficient to use either a lamp 35, or preferably, a lamp 36 arranged on each phase.

It may be desired to adjoin a totalizer to the meter proper. In this case, use can be made of the rotating field produced for actuating the totalizer. Instead of placing only one bell 30 in the airgap, two bells can be arranged therein. One of these bells always serves to indicate the speed, as described, whilst the other is subjected to a braking torque proportional to the speed, as in electric energy meters.

This second bell then takes an angular speed exactly proportional to that of the field and releases the totalizer every time the said bell has effected a number of revolutions. This second bell might also be placed in a rotating field created for the same, and distinct from the first one.

The apparatus can be compensated concerning the variations of temperature, by choosing, for the bell 30, a metal of suitable nature. The washer 27 can also be used as magnetic shunt, for serving to compensate the apparatus according to the variations of temperature.

It is to be noted that a change in the direction of rotation of the shaft the speed of which is to be measured, owing to the fact that it changes the direction of rotation of the field, causes the direction of rotation of the index 32 to change, this allowing to obtain meters presenting the zero at the middle of a double scale. Such a particularity allows, by the simple permutation of the connection wires, of modifying, at will, the direction of displacement of the meter, whatever may be the direction of rotation of the shaft the speed of which is to be measured.

The speed indicator forming the subject-matter of the invention can receive any applications; however, it is to be noted that its application to aeronautics or to aviation is very advantageous, as the distributor, which necessitates, for its actuation, a very small torque only, can be very easily moved by a propeller arranged in the relative wind of the vehicle.

What I claim as my invention and desire to secure by Letters Patent is:—

1. In a speed indicator, a casing having two pairs of opposed polar pieces and cores, with windings thereon, each opposing pair adapted to be energized at the same time by an electric current, said cores being of reduced cross section whereby they are maintained saturated regardless of variations in the current supply, an inverted metal bell having a pintle pivotally mounted in the magnetic field created by the polar pieces, resilient resisting means acting in opposition to the rotation of the metal bell, a dial on the casing, and an indicating pointer on the end of the metal bell pintle for registering the revolution of the metal bell on the dial, when the windings and cores are energized from a source of electrical energy.

2. In a speed indicator, an indicator receiver having a casing, two pairs of opposed armatures, said armatures being of reduced cross section whereby they are maintained saturated regardless of the variation in the current supply, having windings thereon mounted in the casing, each pair being in opposed relation to each other, and adapted to be electrically energized at one and the same time from a source of electrical energy, a metal bell pivotally mounted and adapted to be actuated by the alternate energizations of each pair of armatures, and resisting and indicating means for the metal bell, for the purpose of indicating the degree of revolution of said metal bell when actuated by the magnetic field of the said armatures.

In testimony whereof I have signed this specification.

RENÉ JACQUES HENRI PLANIOL.